(12) United States Patent
Barnett Jordan et al.

(10) Patent No.: US 6,954,788 B2
(45) Date of Patent: Oct. 11, 2005

(54) COMMUNICATION RESOURCE SYSTEM

(75) Inventors: Michelle R. Barnett Jordan, Littleton, CO (US); Henry Alcala, Littleton, CO (US); Nell M. Trask, Littleton, CO (US); Stephen John Molnar, Jr., Hudson, OH (US); Jason Garry Stutchbury, Centennial, CO (US)

(73) Assignee: Qwest Communications International, Inc., Denver, CO (US)

( * ) Notice: Subject to any disclaimer, the term of this patent is extended or adjusted under 35 U.S.C. 154(b) by 300 days.

(21) Appl. No.: 10/180,631

(22) Filed: Jun. 26, 2002

(65) Prior Publication Data

US 2004/0003065 A1 Jan. 1, 2004

(51) Int. Cl.[7] .......................................... G06F 15/173
(52) U.S. Cl. ........................ 709/223; 707/10; 709/224
(58) Field of Search ................................ 709/223–226, 709/200–203, 238–244

(56) References Cited

U.S. PATENT DOCUMENTS

| | | | |
|---|---|---|---|
| 4,956,835 A | 9/1990 | Grover | 370/16 |
| 5,067,148 A | 11/1991 | Sardana | 379/111 |
| 5,435,003 A | 7/1995 | Chng et al. | 395/575 |
| 5,515,367 A | 5/1996 | Cox, Jr. et al. | 370/60.1 |
| 5,680,326 A | 10/1997 | Russ et al. | 364/514 |
| 5,850,505 A | 12/1998 | Grover et al. | 395/182.02 |
| 5,974,127 A | 10/1999 | Wernli et al. | 379/201 |
| 6,023,452 A | 2/2000 | Shiragaki | 370/227 |
| 6,026,073 A | 2/2000 | Brown et al. | 370/216 |
| 6,137,775 A | 10/2000 | Bartlett et al. | 370/216 |
| 6,209,033 B1 * | 3/2001 | Datta et al. | 709/224 |
| 6,690,646 B1 * | 2/2004 | Fichou et al. | 370/231 |
| 6,711,137 B1 * | 3/2004 | Klassen et al. | 370/252 |

* cited by examiner

Primary Examiner—John Courtenay, III
(74) Attorney, Agent, or Firm—Robert G. Crouch; Marsh Fischmann & Breyfogle LLP (57) ABSTRACT

A communication resource system and method for determining communication product capacity in a communication network based on the physical capacity of individual network components. The communication resource system compiles spare capacity information for the individual network components into information on a quantity of communication products that may be provided based on the capacity available on the individual network components. The communication resource system includes a processing coupled to an interface system. The processing system is configured to process equipment capacity information and circuit capacity information to generate the product capacity information. The interface system is configured to receive the equipment and circuit capacity information and provide the product capacity information for the processing system.

20 Claims, 4 Drawing Sheets

COMMUNICATION RESOURCE SYSTEM

FIELD OF THE INVENTION

The invention is related to communication networks, and in particular, to a method and system for determining spare product capacity within a communication network based on the spare capacity of equipment and circuits within the communication network.

BACKGROUND OF THE INVENTION

Communication networks are made up of numerous equipment and connections that are used to provide the various different communication services to network customers. In the art of communications, these communication services are often referred to as communication products. Communication products are provided to network customers using various different combinations of network equipment and circuits as a function of the type of communication product being provided. For example, an ISDN access path product may require a first combination of equipment and circuits between a central office and the network customer. A digital subscriber line (DSL) access path product, on the other hand, may require a second combination of equipment and circuits. In addition there is often overlap where same equipment and circuits used to provide one product are combined with other equipment and circuits to provide another product.

Present communication networks often have the ability to determine network capacity from a physical standpoint, that is, the available capacity on or within any one of the individual pieces of equipment and circuits that make up the network. Unfortunately, however, present networks do not have the ability to determine network capacity from a logical or product standpoint. In other words, they do not have the ability to determine an available number of communication products that may be provided based on the capacity of the equipment and circuits required to provide the specific products (the physical capacity within the network).

Unfortunately, to determine product capacity, a network operator must acquire the physical capacity data, e.g. data on the available capacity of the equipment and circuits within a service area that are required to provide the desired product. This data is then manually analyzed and logically modeled to determine the number of the desired product available based on the available physical capacity of the equipment and circuits.

SUMMARY OF THE INVENTION

It is therefore an object of the present invention to provide an automated communication resource system and method for determining product capacity within a communication network. It is another object of the present invention to provide an automated system that compiles the spare capacity of individual network components into information on a quantity of products that may be provided based on the spare capacity of the individual network components.

In the context of the present invention, the quantity of products that may be provided is referred to herein as "product capacity information." Also, in the context of the present invention, the product capacity information may be product capacity information for a specific communication product, e.g. DSL access paths, or for numerous communication products, e.g. DS1, DS2, DS3, and DSL access paths or services etc.

In carrying out the above objects, and other objects, features, and advantages of the present invention, a method for providing capacity information in a communication network is provided. The method includes the step of receiving in a communication resource system, equipment capacity information for equipment within the communication network. The method also includes the step of receiving in the communication resource system, circuit capacity information for circuits within the communication network. Still further, the method includes processing in the communication resource system, the equipment capacity information and the circuit capacity information to generate product capacity information based on the equipment capacity and circuit capacity information.

Various refinements exist of the features for the above noted method steps. Further features may also be incorporated into the present method as well. These refinements and additional features will be apparent from the following description and may exist individually or in any combination. For example, the method may also include the steps of receiving in the communication resource system, a query for the product capacity information from a user and processing the query to provide the product capacity information to the user. In this regard, the product capacity information could be the available quantity of a communication product from a location within the communication network. Similarly, the product capacity information may be the available quantity of a communication product between two points within the communication network. The product capacity information may also include additional information. For example, the product capacity information may include an inventory of available equipment and circuits for the communication product. In another example, the product capacity information may include information related to various models, e.g. different combinations of equipment and circuits that could be used to provide a communication product. In still yet another example, the product capacity information may include information on the location within the network of the equipment and circuits for the product.

In further carrying out the above objects, features and advantages of the present invention, a communication resource system is provided for carrying out the steps of the above method. The communication resource system includes a processing system and an interface system coupled to the processing system. The processing system is configured to process equipment capacity information and circuit capacity information to generate the product capacity information for the communication network. The interface system is configured to receive the equipment capacity information and circuit capacity information and provide the product capacity information for the processing system.

Various refinements exist of the features for the above noted communication resource system. Further features may also be incorporated into the communication resource system as well. These refinements and additional features will be apparent from the following description and may exist individually or in any combination. For example, the communication resource system may also include a user interface that permits users to access the communication resource system and generate various different queries related to the product capacity information. For example, a user may generate a query that results in product capacity information from a specific location, e.g. a wire center, within the communication network. In another example, a user may generate a query that results in product capacity information between two points within the communication network. In yet another example, the user may generate additional information from query results such as an inventory of available equipment and circuits for the communication product. In another example, the additional information may include information related to various models, e.g. different combinations of equipment and circuits that could be used to provide a communication product. In still yet another example, the additional information may include information on the location within the network of the equipment and circuits for the product.

DETAILED DESCRIPTION

Reference will now be made to the accompanying drawings, which at least assist in illustrating the various pertinent features of the present invention. For purposes of illustration, the present invention will now be described in the context of a system and method used by a telecommunications service provider. It should be understood, however, that the present invention is not limited to this environment, but instead, could be utilized by any type of network operator, public or private, to determine network capacity from a product standpoint.

Figure 1:
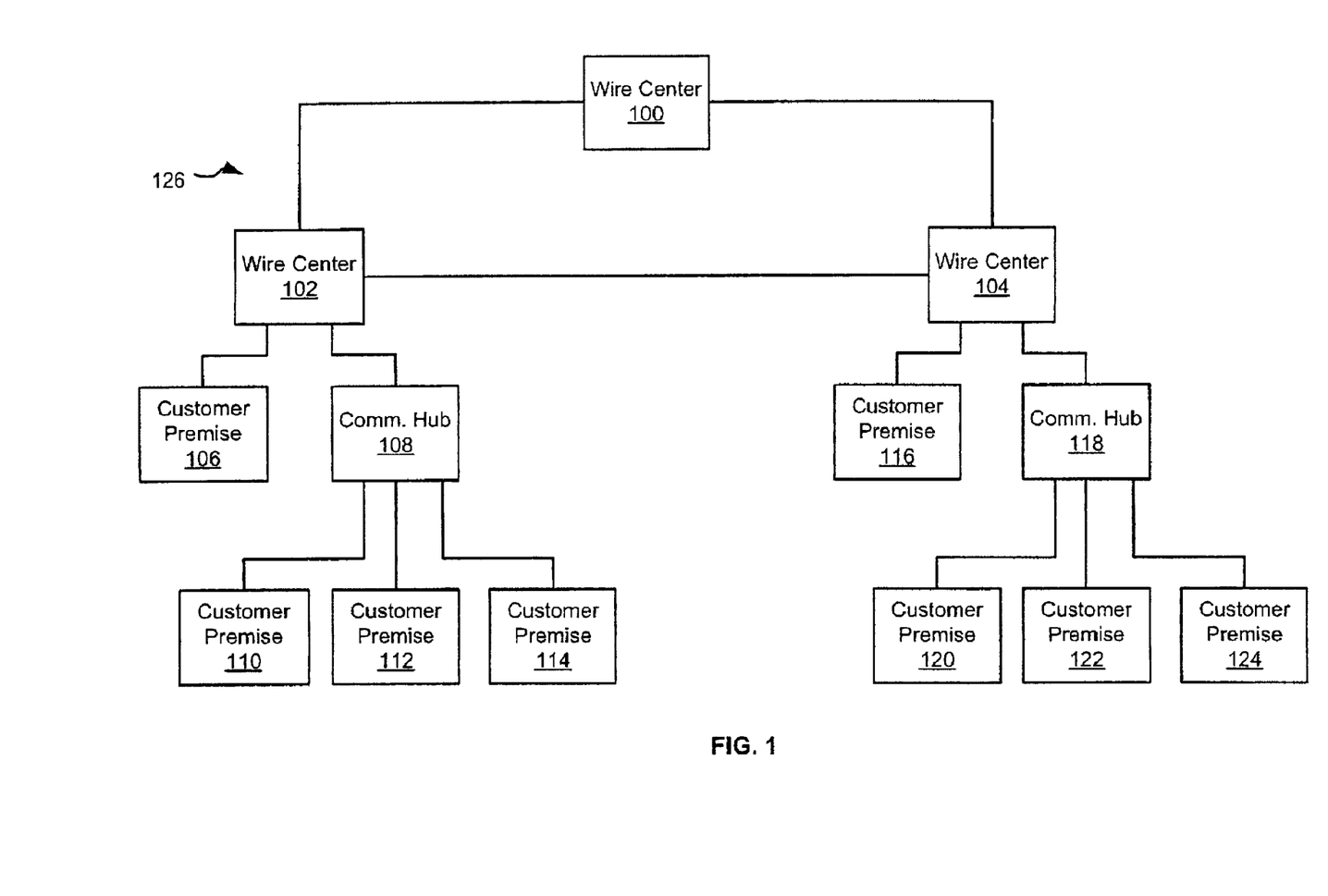
FIG. 1 illustrates an example of a communication network.

FIG. 1 illustrates a block diagram of a communications network 126 suitable for implementing the present invention. It will be appreciated, however, that communication network 126 is provide for purposes of illustration and that numerous other network environments exist that are suitable for implementing the present invention. In addition, the network 126 would typically include additional conventional components not shown on FIG. 1 for clarity.

FIG. 1 depicts three wire centers 100–104, communication hubs, 108 and 118, and customer premises 106, 116, 110–114 and 120–124. Wire center 100 is connected to wire centers, 102 and 104, which in turn are connected to each other. Customer premise 106 and communication hub 108 are connected to wire center 102. Customer premises 110–114 are connected to communication hub 108. Customer premise 116 and communication hub 118 are connected to wire center 104. Customer premises 120–124 are connected to communication hub 118.

The present invention is directed to a communication resource system that determines spare capacity in the communication network 126 from a product standpoint. In this regard, the present communication resource system looks at the available capacity of the communication network 126 at the physical level, e.g. equipment and circuits that have spare capacity, and logically assembles the physical capacity information to generate product capacity information within the network. That is, the communication resource system determines a quantity of communication products available within the network 126 based on spare capacity existing on the various pieces of equipment and circuits that make up the communication network 126 and that may be used to provide communication products.

In the context of the present invention, a communication product refers to the combination of equipment and circuits required to provide a communication service. The communication service could be any service that is supported by the communication network 126. Some examples of communication products may include without limitation, DS1, DS2, DS3, DSL, ISDN, etc. services provided to customers of the service provider. Also, in the context of the present invention, a "circuit" is a communication connection or signal that is routed through the communication network 126. A circuit may correspond to a large number of individual telephone lines. For example, a circuit may be a T1 circuit, which typically carries 24 voice conversations. A communication path, on the other hand, is the carrier for a circuit or a plurality of circuits. Also, in the context of the present invention, communication "equipment" is the equipment used to route a circuit through the communication network 126. For example, the equipment could include equipment in the communication hub 108, equipment at one of the customer premises, e.g. 110, equipment at one of the wire centers, e.g. 102, such as loop components, switching equipment, and interoffice equipment that connect the individual wire centers, e.g. wire centers 102 and 104. Thus, some examples of communication equipment may include without limitation, multiplexers, routers, T1 terminals, ISDN cards etc.

Figure 2:
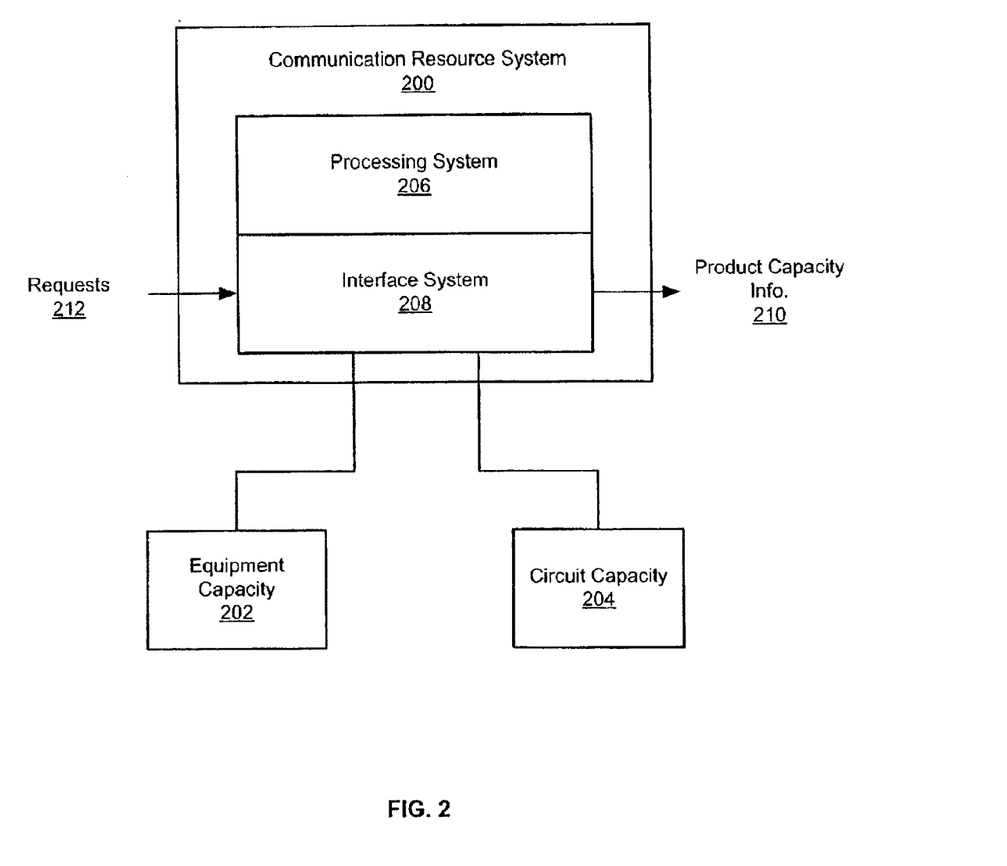
FIG. 2 illustrates an example of a communication resource system according to the present invention.

FIG. 2 illustrates one example of the present communication resource system. On FIG. 2 a communication resource system 200, an equipment capacity system 202, and a circuit capacity system 204 are depicted. The communication resource system 200 includes a processing system 206 coupled to an interface system 208.

The equipment capacity system 202 could be any device or group of devices that provides information on the capacity of equipment within the communication network 126. The circuit capacity system 204 could be any device or group of devices that provides information on the capacity of circuits within the communication system 126. One example of the equipment capacity system 202 and the circuit capacity system 200 is a legacy system which inventories equipment and circuits from provisioning systems, such as Trunk Integrated Record Keeping Systems and Facilities and Equipment Planning Systems, which as is well known in the art, track capacity and utilization for both equipment and circuits within the communication network 126.

The processing system 206 could be any processor or group of processors configured to receive equipment capacity information from the equipment capacity system 202, receive circuit capacity information from the circuit capacity system 204, and process this information to generate product capacity information 210. As discussed above, the product capacity information 210 could be any information on a quantity of spare communication products based on the spare equipment capacity and the spare circuit capacity within the communication network 126. For example, the product capacity information 210 could be a total number of available communication products, e.g. ISDN products, available from a specific location within the network 126, such as the wire center 102. In other words, the product capacity information 210 could be the number of ISDN services available to customers serviced by the wire center 102. In the context of the present invention, this is referred to as "aggregate" product capacity information. In another example, the product capacity information 210 could be the total number of available communication products, e.g. DS3 access paths, between any two points within the communication network 126, e.g. the communication hub 108 and the communication hub 118. In the context of the present invention, this is referred to as "point-to-point" product capacity information.

As will become apparent from the following description, the present invention may also include a user interface that provides user access to the communication resource system 200. In this case, the processing system 206 may receive requests, such as requests 212, from the user interface that include requests for desired product capacity information 210. The user interface may permit the user to define query parameters for the desired product capacity information 210, such as, specific products to be searched and whether the search is for aggregate or point-to-point product information.

The interface system 208 could be any device or group of devices configured to receive the equipment capacity information from the equipment capacity system 202 and receive the circuit capacity information from the circuit capacity system 204 for the processing system 206. The interface system 208 may also receive the requests 212 from the user interface and provide the product capacity information 210 to the user for the processing system 206. It will also be appreciated that the interface system 208 may include some or all of the logic for the user interface as a matter of design choice.

Figure 3:
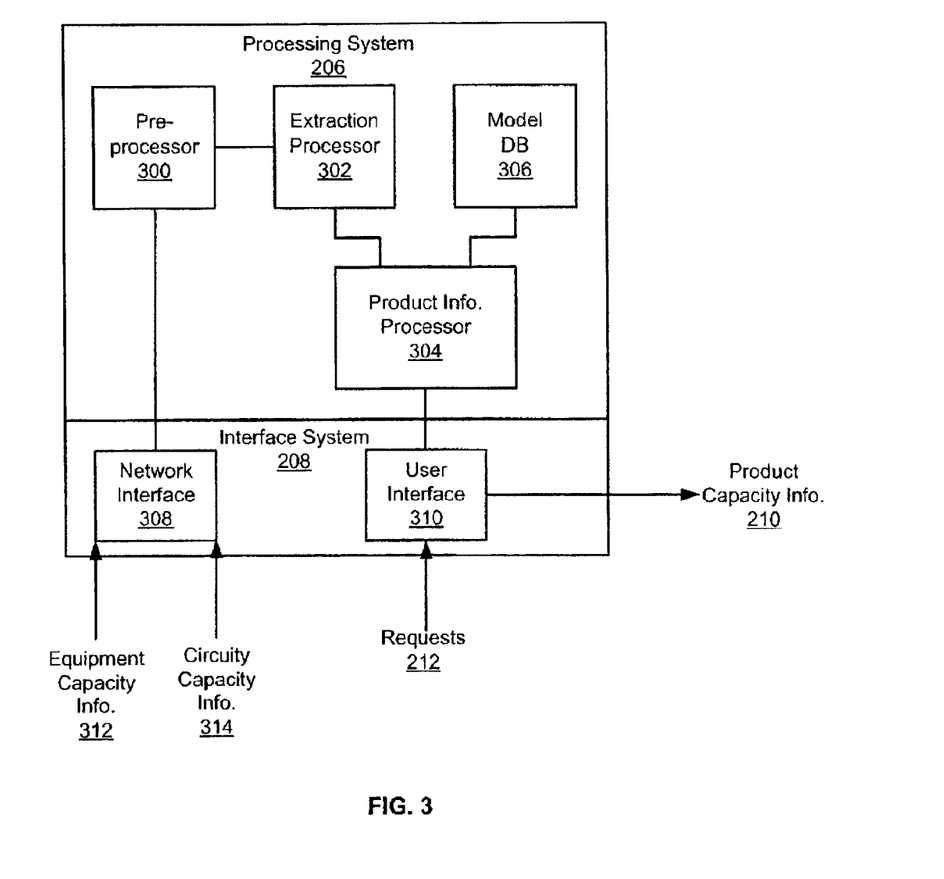
FIG. 3 illustrates an example of the processing logic for a communication resource system according to the present invention.

FIG. 3 illustrates an example of the processing logic for the communication resource system 200. Those skilled in the art will appreciate that numerous other configurations of the processing logic can be derived from the following example that are within the scope of the invention. Those skilled in the art will also appreciate how the principles illustrated in this example can be used in other examples of the invention.

FIG. 3 depicts processing system 206 and interface system 208. The processing system 206 includes a pre-processor 300, an extraction processor 302, a product information processor 304, and a model database 306. The interface system 208 includes a network interface 308 and a user interface 310.

The network interface 308 could be any device or group of devices that provides data request messages to the equipment capacity system 202 and the circuit capacity system 204 for the processing system 206. The network interface 308 also receives response messages for the processing system 206 that include the equipment capacity information 312 and circuit capacity information 314 from the equipment capacity and circuit capacity systems 202 and 204. Specifically, the network interface 308 provides the equipment capacity information 312 and circuit capacity information 314 to the pre-processor 300.

The pre-processor 300 generates and provides the data request messages to the network interface 308. The pre-processor 300 also receives the raw data (equipment capacity information 312 and circuit capacity information 314) from the network interface 308 and performs basic manipulation on the raw data. For example, the pre-processor 300 may organize the equipment capacity information 312 and the circuit capacity information 314 into an equipment capacity staging table and a circuit capacity staging table. The pre-processor 300 may also assign a location code to the equipment data and circuit data in the staging tables. The location code could be any code that identifies the location of individual equipment and circuits within the network 126. The location codes may also indicate a service area location as well as a physical address location for the individual equipment and circuits within the network 126. Similarly, the pre-processor 300 may assign a product code to the equipment data and circuit data in the staging tables. The product code could be any code that associates a piece of equipment and/or circuit with the product(s) supported by the individual equipment and/or circuit. It will be appreciated that pre-processor 300 may also include additional functionality such as a data update function that periodically updates the equipment and circuit data. For example, the pre-processor 300 may use batch processing and perform a data retrieval/update on a daily, weekly, or monthly basis. Alternatively, it will be appreciated that the retrieval/update could be performed at any interval as a matter of design choice. Finally, the pre-processor 300 makes the equipment and circuit capacity staging tables available to the extraction processor 302.

The extraction processor 302 performs additional processing on the equipment and circuit data in the staging tables to calculate spare product capacity within the network 126. For example the extraction processor 302 may access the staging tables according to the location of the equipment and circuits with spare capacity. In that regard, the extraction processor 302 may further process the data in the equipment and circuit staging tables to generate location specific equipment and circuit tables according to the location of the individual equipment and circuits within the network 126. For example, all equipment having spare capacity and that is located at the wire center 104 may be extracted from the equipment staging table and included in an equipment table according to its location at the wire center 104. Similarly, all equipment having spare capacity and that is located at the customer premise 116 may be included in another equipment table according to its location at the customer premise 116. In this manner, the extraction processor 302 processes the equipment data in the equipment staging table until all of the equipment having spare capacity within the network 126 is organized according to its location within the network 126.

In a similar manner, the extraction processor 302 processes the data in the circuit staging table according to its location within the network 126. For example, all circuits having spare capacity and that are located between the communication hub 118 and the customer premise 124 may be extracted from the circuit staging table and included in a circuit table according to their location between the communication hub 118 and the customer premise 124. Similarly, all circuits having spare capacity and that are located between the wire center 104 and the communication hub 118 may be extracted from the circuit staging table and included in a circuit table according to their location between the wire center 104 and the communication hub 118. In this manner, the extraction processor 302 processes the circuit data in the circuit staging table until all of the circuits within the network 126 having spare capacity are organized according to their location within the network 126.

The model database 306 includes models of the various different products provided over the communication network 126, e.g. logical representations of the equipment and circuits required to provide the various products. For example, the model database 306 could include a model (logical representation) of the required equipment and circuits for a DS3 access path within the network 126. Additionally, the model database 306 could include a model of the required equipment and circuits for an ISDN access path within the network 126 and so on. Advantageously, the model database 306 provides a single point of access where system administrators may access and update product models as new products are offered, and existing products are phased out.

The product information processor 304 manages access to the communication resource system 200. In that regard, the product information processor 304 may access the model database 306 and extraction processor 302 to generate the product capacity information 210 in response to the requests 212 from users. For example, in response to a request for ISDN access path information from the wire center 104, the product information processor 304 may access the ISDN access path product model on the model database 306 and access the extraction processor 302 to construct the ISDN access path product information based on the equipment and circuits with spare capacity that are required to provide ISDN access paths and that are available from the wire center 104. In a similar manner, the product information processor 304 processes other requests 212 for product information to generate the requested product information 210.

In one example of the present invention, the processing system 206 may use data structure processing. A data structure is a logical table, e.g. the equipment and circuit tables constructed by the extraction processor 300, that can be entered using information or pointers to yield additional information or a pointer to another data structure. In this regard, the processing system 206 may processes a data structure until the data structure yields either the desired information or a pointer to another data structure.

Figure 4:
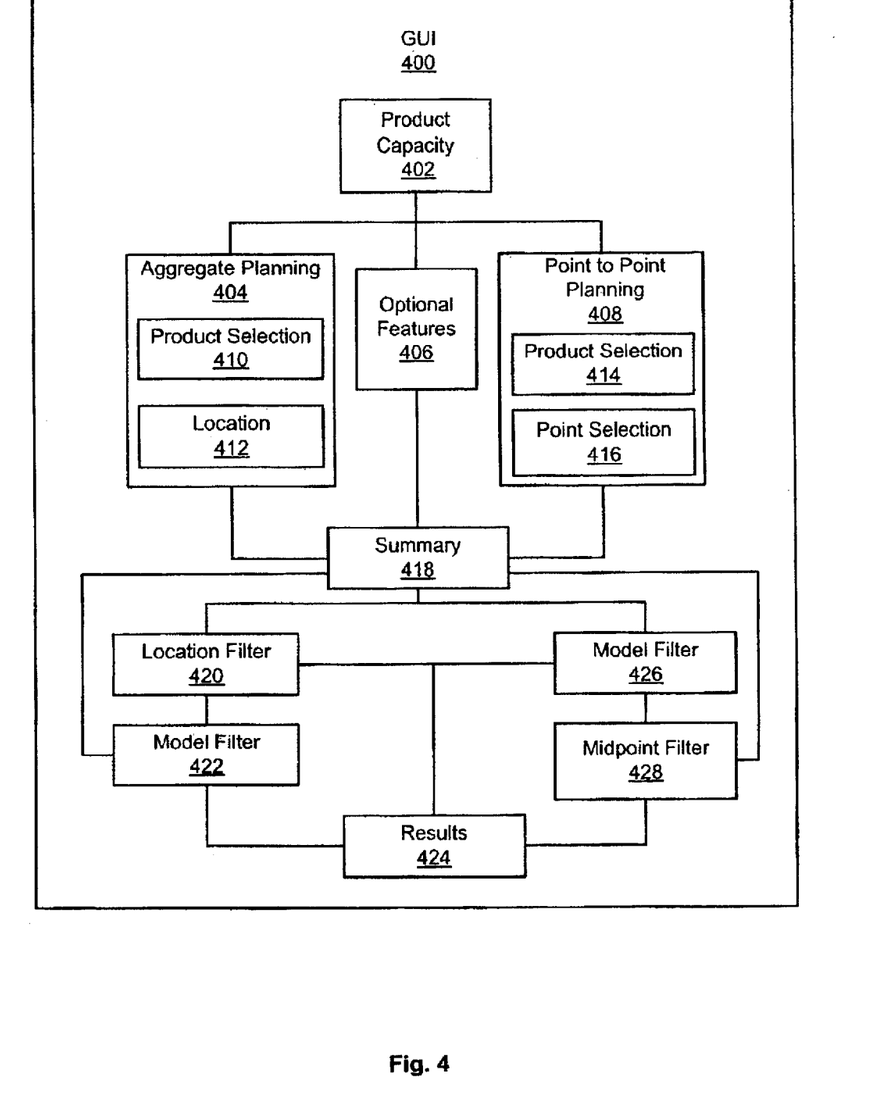
FIG. 4 illustrates an example of an operational protocol and user interface according to the present invention.

Referring to FIG. 4, the present invention may include a user interface such as the graphical user interface (GUI) 400. The GUI 400 provides a means for users to interface with the communication resource system 200 and contains custom modules for entering search data, selecting options, and displaying results. It will be appreciated that the GUI 400 may reside on the interface system 208 or other server and provide remote access to users, such as via the Internet. Alternatively, the GUI 400 may reside on a user device, such as a workstation, to provide either remote or direct user access. Finally, it will be appreciated that some logic may reside on the interface system 208 while other logic resides on a user device or other server.

One module in the GUI is the product capacity module 402. The product capacity module 402 is the interface to access the different product capacity tools, namely the aggregate planning tool 404, the optional features tool 406, and the point-to-point planning tool 408.

The aggregate planning tool 404 is used to obtain aggregate product capacity information 210 from a location within the network 126. In that regard, the aggregate planning tool 404 includes product selection logic 410 and location selection logic 412. The product selection logic 410 permits a user to select a product, e.g. DS1, DS3, ISDN, etc. that the user desires capacity information. The location selection logic 412 permits the user to select a location within the network 126 that the user desires to obtain the product capacity information 210 for a selected product. For example, using the product selection logic 410 and location selection logic 412, a user may obtain information on the aggregate number of ISDN access path products from the wire center 102. In other words, the total number of available ISDN access path products that can be provided from the wire center 102 based on the capacity of the equipment and circuits necessary to provide an ISDN access product.

The product selection logic 410 may also include other logic such as the ability to obtain a pictorial output of a product model, e.g. the required equipment and circuits needed to provide a product. In other words, during product selection, a user may obtain a popup picture of the various product models available on the communication resource system 200. The location selection logic 412 may also include various options for selecting a location within the network 126. For example, the location selection logic 412 may include an option to select a specific serving area, physical address, and/or wire center within the network 126. It will be appreciated that numerous other examples of additional logic that are within the scope of the invention could be included in the product selection logic 410 and location selection logic 412.

Another module in the GUI 400 is the summary module 418. The summary module 418 is used to provide a summary of the initial query results for the product capacity information 210. For example, the initial query results may include a total number of spare facilities available for use at any of a number of locations within the network 126. In the context of the present invention, the term "spare" is used to indicate an available quantity of capacity, e.g. number of products. Thus, the initial query results based on a query for available DS1 access path products from the wire center 102 may be as follows: "For the wire center 102 as of X date, there are 82 spare facilities available for use at any of 17 customer premise addresses." The initial query results may also include a breakdown in tabular format of the customer premise addresses and spare facilities available for use at each of the customer premise addresses. The initial query results may also include a component inventory in a tabular format that lists the equipment and circuits along with a specific quantity of each that are available, e.g. 576 spare T1 circuits, 875 spare ISDN cards, etc. Advantageously, this component breakdown immediately identifies to the user the limiting factor for the requested product at the requested location e.g. the limiting equipment and/or circuit.

The initial query results may also include additional information related to product capacity. For example, in some cases, an initially selected model may include multiple sub-models that could be used to construct a specific product type, e.g. a DS1 model may include a copper T1 sub-model and HDSL sub-model, both of which could be used to provide a DS1 product. In this case, the initial query results would represent a total number of spare products available, e.g. both copper T1 and HDSL products. Further, the initial query results may also include a break down of the total number of spare products by model type, e.g. 68 spares for copper T1 and 14 spares for HDSL.

Another module in the GUI 400 is the location filter module 420. The location filter module 420 permits a user to obtain additional information relating to product capacity. Specifically, the location filter module 420 permits the user to analyze the initial query results and generate additional queries based on the information provided in the initial query results. For example, where the initial location selection was wire center 102, the location filter module 420 may be used to generate product capacity information for a specific service area or location within the area covered by the wire center 102.

Another module in the GUI 400 that may be used to obtain additional information related to the initial query results is the model filter module 422. The model filter module 422 is utilized in the case where sub-models exist. The model filter module 422 permits the user to further filter the initial query results and obtain detailed product capacity information based on one or all of the sub-models. For example, the user may generate a sub-model query based on the initially selected location (wire center 102) or a sub location (selected using the location filter logic 420) and receive query results. The query results may include, for example, an aggregate number of spare DS1 access path products using the copper T1 sub-model. As with the initial query results, the sub-model query results could include a component inventory listing in tabular format of the equipment and circuits required for the sub-model along with a specific quantity of each available. The model filter module 420 may then be used to generate a similar sub-model query using other sub-models, such as the HDSL sub-model.

The output of the model filter module 422 and location filter module 420 is provided to the results module 424. The results module 424 is used to display query results to the user. In other words, from the summary module a user may generate additional queries based on one or more locations using the location filter 420, generate additional queries based on one or more sub-models using the model filter 422, or generate additional queries based on combinations of locations and sub-models using both the location filter module 420 and model filter module 422. The results from any of the above additional queries are displayed using the results module 424. In addition, the results module 424 may also include additional functionality such as the ability to export the query results to other equipment and/or software applications. For example, the results module 424 may include functionality to export query results to a spreadsheet or word processor software application for additional analysis by the user.

The point-to-point planning tool 408 is used to obtain product capacity information 210 between any two points within the network 126. In that regard, the point-to-point planning tool 408 includes product selection logic 414 and point selection logic 416. The product selection logic 414 is similar to the product selection logic 410 in that it permits a user to select the product for which the user desires capacity information. The point selection logic 412, on the other hand, permits the user to select any two points within the network 126 for which the user desires to obtain the product capacity information 210 for the selected product. For example, using the product selection logic 414 and the point selection logic 416, a user may obtain information on the available number of DS3 access path products between the customer premise 110 and the customer premise 116. In other words, the total number of available DS3 access path products that are available between the customer premise 110 and the customer premise 116 based on the spare capacity of equipment and circuits necessary to provide DS3 access path products between the chosen points.

As with the product selection logic 410, the product selection logic 414 may also include other functionality such as the ability to obtain a pictorial output of the product models. Similarly, the point selection logic 416 may include the ability to select points within the network 126 that are defined by a physical address, defined by service area, or defined by a location code. For example, the points selected in the point selection logic 416 may be two serving areas as opposed to a pair of physical addresses within the network 126.

As with the aggregate planning tool 404, the summary logic 418 is used to provide a summary of the initial query results for the product capacity information 210 to the user. For example, the initial results based on a query for available DS1 products between the customer premise 110 and the customer premise 116 may be as follows: "Between customer premise 110 in wire center 104 and customer premise 116 in wire center 102 in the state of Y, as of X date, there are 4 facilities that are spare and available for use." In other words, there are a total number of 4 spare DS1 access paths between customer premise 110 and customer premise 116 over the communication path between wire centers 102 and 104.

Another module in the GUI 400 is the model filter module 426 for the point-to-point tool 408. Similar to the model filter module 422, the model filter module 426 is utilized in the case where sub-models exist to further filter the initial query results and obtain more detailed product capacity information 210 based on selected sub-models. For example, as with the above-described aggregate query for DS1 products, the user may select the T1 sub-model and receive query results that include a total number of spare DS1 access path products between the customer premises 110 and 116 using the copper T1 sub-model. As with the initial query results, the sub-model query results could include a component inventory that lists in tabular format the equipment and circuits needed for the sub-model along with a specific quantity of each available. The model filter module 426 may then be used to generate a similar sub-model query using other sub-models, such as the HDSL sub-model.

Another module in the GUI 400 for the point-to-point tool 408 is the midpoint filter module 428. The midpoint filter module 428 permits a user to further analyze the product capacity information 210 by generating additional queries using midpoints, e.g. the number of spare DS1 access path products over the communication path defined by wire centers 102, 100, and 104, as opposed to the communication path between wire centers 102 and 104. In this case, the wire center 100 is a midpoint between wire centers, 102 and 104, that may be used as an alternate routing for spare DS1 access path products.

Where midpoints exist, the initial query results may include product capacity information 210 for both a direct path calculation and a midpoint path calculation. In other words, the initial query results may indicate that 4 spare products are available where midpoints are not utilized and 372 spare products are available where one or more midpoints are utilized. It should be noted that the 372 spare products available where midpoints are utilized could be a summation of all spare products over all possible midpoint combinations. The midpoint filter module 428, however, permits the user to run additional queries based on the various different midpoint path combinations that exist between the customer premises, 110 and 116, to obtain product capacity information for each midpoint combination.

Advantageously, the query results for the additional queries generated using the model filter module 426 and the midpoint filter module 428 may also include a component inventory in a tabular format listing the equipment and circuits along with a specific quantity of each available, e.g. 576 spare T1 circuits, 875 spare ISDN cards, etc based on the different midpoint paths and models. Again, this provides the significant advantage of immediately identifying to the user the limiting factor in each query, e.g. the specific piece of equipment or circuit along each midpoint path or within each model.

Thus, similar to the above example for the aggregate planning tool 404 a user may generate additional queries based on one or more midpoints using the midpoint filter 428, generate additional queries based on one or more sub-models using the model filter 426, or generate additional queries based on combinations of midpoints and sub-models using both the midpoint filter module 428 and model filter module 426. Also, as with the above example, the output of the model filter module 426 and the midpoint filter module 428 is provided to the results module 424 for display to the user.

The optional features tool 406 is used to apply additional logic to the data available on the communication resource system 200. Some examples of such additional logic could be the selection and generation of product capacity information for other networks, reporting functionality including without limitation, equipment reports specifying equipment required for various communication products, fiber reports, e.g. specifying A to Z points and splice points, fiber reports specifying fiber visible from a specific address, equipment reports specifying equipment within a specific building or at a specific location, various other reports related to fiber and equipment capacity etc.

The above-described elements can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing systems are integrated circuits and logic circuitry. Those skilled in the art are familiar with instructions, processing systems, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for providing capacity information in a communication network, the method comprising:
   receiving in a communication resource system, equipment capacity information for equipment within the communication network;
   receiving in the communication resource system, circuit capacity information for circuits within the communication network;
   in the communication resource system, processing the equipment capacity information and the circuit capacity information to generate product capacity information based on the equipment capacity and circuit capacity information, wherein the processing includes accessing a model database that includes logical representations of the required equipment and circuits for the various products provided over the communication network.

2. The method of claim 1 the method comprising:
   receiving in the communication resource system, a query for the product capacity information from a user; and
   processing the query to provide the product capacity information to the user.

3. The method of claim 2 wherein the product capacity information comprises:
   information on a number of communication products available in the communication network using available capacity of the equipment and the circuits within the communication network.

4. The method of claim 3 wherein the product capacity information comprises:
   the available quantity of a communication product from a location within the communication network.

5. The method of claim 3 wherein the product information comprises:
   the available quantity of a communication product between a first point and a second point within the communication network.

6. The method of claim 5 wherein the product capacity information comprises:
   an inventory of available equipment and circuits within the communication network for the communication product.

7. The method of claim 6 wherein the communication product is a communication service provided over the communication network.

8. The method of claim 2 wherein the user can define query parameters to obtain desired product capacity information.

9. The method of claim 1 wherein equipment within the communication network includes multiplexers, routers, T1 terminals, and ISDN cards located in a communications hub, at a customer premises, or at a wire center.

10. The method of claim 1 wherein circuits within the communication network include multiple telephone lines such as can be carried on a T1 circuit.

11. A communication resource system comprising:
    a processing system to process equipment capacity information and circuit capacity information to generate product capacity information in a communication network, wherein the processing includes accessing a model database that includes logical representations of the required equipment and circuits for the various products provided over the communication network; and
    an interface system coupled to the processing system to receive the equipment capacity information and circuit capacity information and provide the product capacity information for the processing system.

12. The system of claim 11 comprising:
    a user interface configured to receive a query for the product capacity information from a user and provide the product capacity information to the user for the processing system.

13. The system of claim 12 wherein the processing system is configured to process a request for the product capacity information from a user to generate the product capacity information and the interface system is configured to receive the request for the processing system.

14. The system of claim 12 wherein the product capacity information comprises:
    information on a number of communication products available in the communication network based on equipment capacity and the circuit capacity within the communication network.

15. The system of claim 14 wherein the product capacity information comprises:
    the number of communication products available from a location within the communication network.

16. The system of claim 14 wherein the product capacity information comprises:
    the number of communication products available between a first point and a second point within the communication network.

17. The system of claim 14 wherein the product capacity information comprises:
    an inventory of available equipment and circuits within the communication network for the communication products.

18. The method of claim 12 wherein the user can define query parameters to obtain desired product capacity information.

19. The method of claim 11 wherein equipment within the communication network includes multiplexers, routers, T1 terminals, and ISDN cards located in a communications hub, at a customer premises, or at a wire center.

20. The method of claim 11 wherein circuits within the communication network include multiple telephone lines such as can be carried on a T1 circuit.

* * * * *